Oct. 18, 1955 V. C. RATLIFF 2,720,679
UNIVERSAL DIE FOR FORMING TIRE TREAD
Filed Aug. 31, 1950 4 Sheets-Sheet 1

INVENTOR:
VERN C. RATLIFF
BY HIS ATTORNEYS
HARRIS, KIECH, FOSTER & HARRIS ized Oct. 18, 1955

United States Patent Office 2,720,679
Patented Oct. 18, 1955

2,720,679

UNIVERSAL DIE FOR FORMING TIRE TREAD

Vern C. Ratliff, Los Angeles, Calif.

Application August 31, 1950, Serial No. 182,461

13 Claims. (Cl. 18—12)

This invention relates to extrusion dies and, more particularly, to an adjustable extrusion die adapted to be utilized in extruding plastic materials.

In order to facilitate the discussion of the invention, it will be disclosed as embodied in an extrusion die adapted to extrude recapping stock formed of various types of rubber and adapted to be utilized in the recapping of worn tires. However, it is not intended that my invention be limited to the specific use disclosed in the following specification, since it is obvious that the principles thereof can be applied with equal utility to the extrusion of various other types of plastic material. The principles of my invention, for example, can be utilized in the formation of various types of plastic tiles and various types of plastic moldings.

The extrusion of recapping material for use in recapping tires has posed many problems, among them being the fact that when the composition of the rubber utilized is changed, the shape of the die necessary to form identical configurations of recapping stock must be changed. For instance, the use of one type of synthetic rubber to form a specific configuration will necessitate the use of one die and the substitution of a recapping stock having a large admixture of crude rubber therein will necessitate the utilization of another die to form the identical configuration.

It is, therefore, a primary object of my invention to provide a completely adjustable extrusion die for the extruding of plastic material which can be immediately set to any desired configuration to accommodate for changes in the composition of the plastic material utilized in the extrusion process.

Another of the handicaps faced by the extruder of recapping stock has been the fact that a huge number of dies must be kept on hand because of the relatively large number of tire sizes and tread shapes for which recapping stock must be provided. Frequently, a tread stock manufacturer has been compelled to maintain a stock of as many as fifteen hundred dies on hand to supply orders to his customers.

Another object of my invention is the provision of an adjustable die for extruding plastic material which can be readily and easily set to any desired configuration and which permits the elimination of the huge stock of dies previously necessary in the extrusion of recapping stock.

A further object of my invention is the provision of an adjustable die for extruding plastic material which includes a plurality of adjustable die members adapted to be individually shifted with respect to one another to form a predetermined configuration in a strip of plastic material extruded past said die members.

An additional object of my invention is the provision in an adjustable die of the aforementioned character, of cutter means associated with the adjustable die members, said cutter means being adapted to further configure the strip of plastic material subsequently to its issuance past said adjustable die members.

In the use of conventional dies for extruding plastic materials, it is frequently necessary to change the dies to alter the configuration of the stock being produced. During these change-over periods production is at a standstill, and since many die changes are necessary, employee time is consumed in making changes or in awaiting the completion of the changes.

Another object of my invention is the provision of an adjustable die for extruding plastic stock which permits the configuration of the stock being extruded to be changed during the operation of the tubing machine or other source of plastic material with which the die is associated. Thus, the shut-down of the tubing machine is eliminated and a great deal of time normally expended in setting up and taking down conventional dies is saved.

An additional object of my invention is the provision of an adjustable die for extruding plastic material which includes a plurality of individually adjustable die members having individual actuators associated therewith so that, by the operation of each of the actuators, the positions of the individual die members with respect to one another can be altered.

Another object of my invention is the provision of an adjustable die for the extrusion of plastic material which includes a plurality of adjustable die members and a plurality of cutters associated therewith, said cutters being mounted on a carriage to permit the positions of said cutters with respect to said die members to be varied.

A further object of my invention is the provision of an adjustable die of the aforementioned character in which the aforesaid carriage has mounted thereupon a plurality of movable mounts on each of which is positioned one of the cutters, said mounts being movable with respect to one another to permit the distance between said cutters to be reduced or increased.

Another object of my invention is the provision of an adjustable die of the aforementioned character in which the springback of the plastic material is automatically accommodated by the shape of the adjustable die members and the manner in which the cutters are associated with said die members.

Other objects and advantages of my invention will be apparent from the following specification and the accompanying drawings, which are for the purpose of illustration only, and in which.

Figure 1:
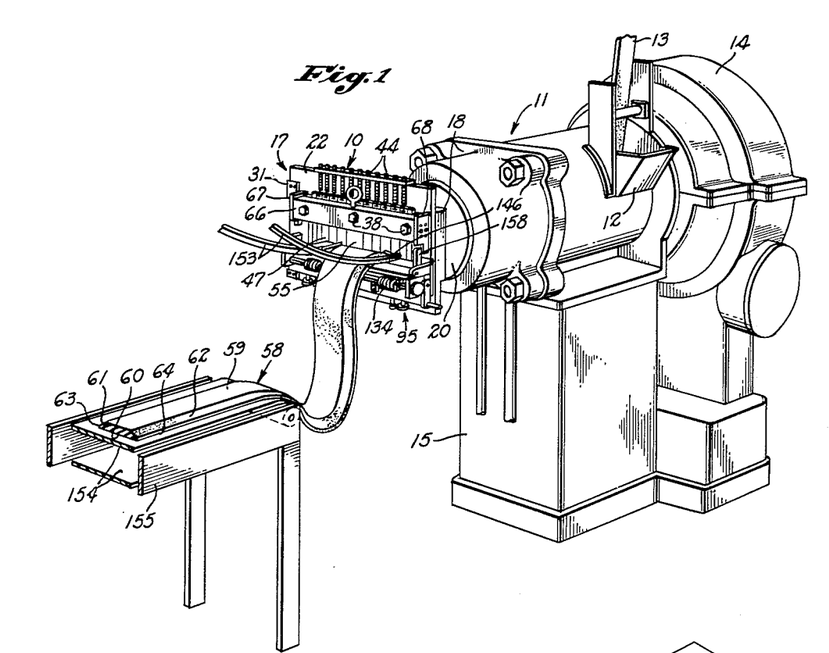
Fig. 1 is a perspective view showing an adjustable die constructed in accordance with my invention mounted upon a tubing machine.

Referring to the drawings and particularly to Fig. 1 thereof, I show an adjustable die 10 constructed in accordance with my invention and mounted upon the delivery end of a tubing machine 11. The tubing machine 11 constitutes no portion of the present invention but for the purpose of illustrating the mode of operation of the adjustable die 10, will be described briefly herein. A hopper 12 is provided at one side of the machine and is adapted to receive a strip 13 of raw material from a suitable source, not shown. The tubing machine 11 incorporates an axially positioned feed screw, not shown, which urges the plastic material, in the present case, a compounded rubber stock, through the neck of the machine to the adjustable die 10. The screw, not shown, of the tubing machine 11 is energized by a motor 14 and the entire machine assembly is supported upon a pedestal 15.

Figure 2:
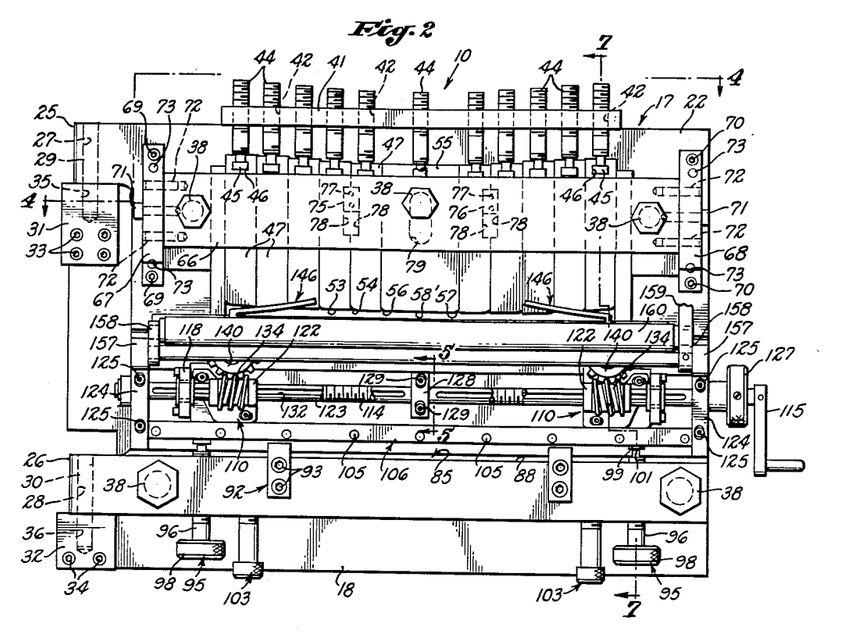
Fig. 2 is a front elevational view of an adjustable die constructed in accordance with my invention.
Figure 3:
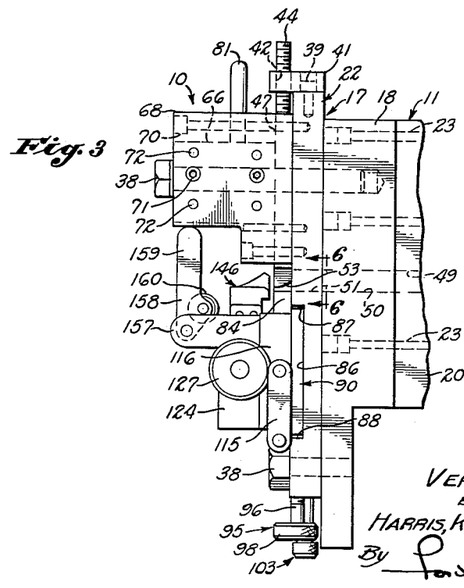
Fig. 3 is an end elevational view of the adjustable die.

The adjustable die 10 includes a substantially rectangular frame 17, as best shown in Figs. 2 and 3 of the drawings, said frame including a mounting plate 18 for securing the adjustable die 10 to the neck 20 of the tubing machine 11 and a die supporting plate 22 which is adapted to support the component parts of the adjustable die 10, in a manner which will be described in greater detail below. The mounting plate 18 is secured to the neck 20 of the tubing machine 11 by bolts 23, or similar fasteners, as best shown in Fig. 3 of the drawings.

Figure 4:
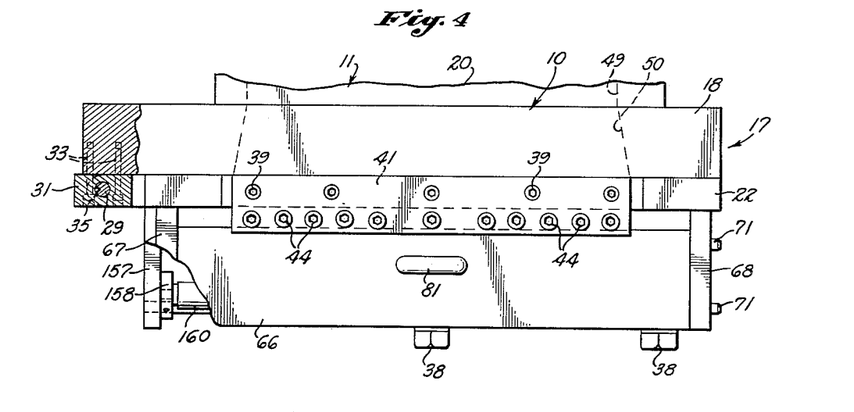
Fig. 4 is a partly sectional, top plan view taken on the broken line 4—4 of Fig. 2.
Figure 5:
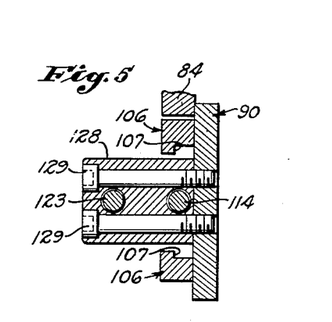
Fig. 5 is an enlarged, sectional view taken from the broken line 5—5 of Fig. 2.

The die supporting plate 22, as best shown in Figs. 2 and 4 of the drawings, has a plurality of hinge ears 25 and 26 formed at the left-hand side thereof, as viewed in the drawings. Formed in the hinge ears 25 and 26, respectively, are vertical bores 27 and 28, said bores having pressed thereinto the upper ends of hinge pintles 29 and 30. The lower ends of the hinge pintles 29 and 30 are receivable in hinge blocks 31 and 32 which are, respectively, attached to the mounting plate 18 by means of fasteners 33 and 34 and which provide receptacles 35 and 36 for the reception of the hinge pintles 29 and 30. Therefore, the die supporting plate 22 can be swung away from engagement with the mounting plate 18 to permit the various portions of the adjustable die to be cleaned and to facilitate the maintenance thereof. The die supporting plate 22 is secured to the mounting plate 18 by means of a plurality of bolts 38, it being necessary to remove the bolts 38 before the die supporting plate 22 can be swung out of engagement with the mounting plate 18.

Figures 7, 8, 9, 10, 11:
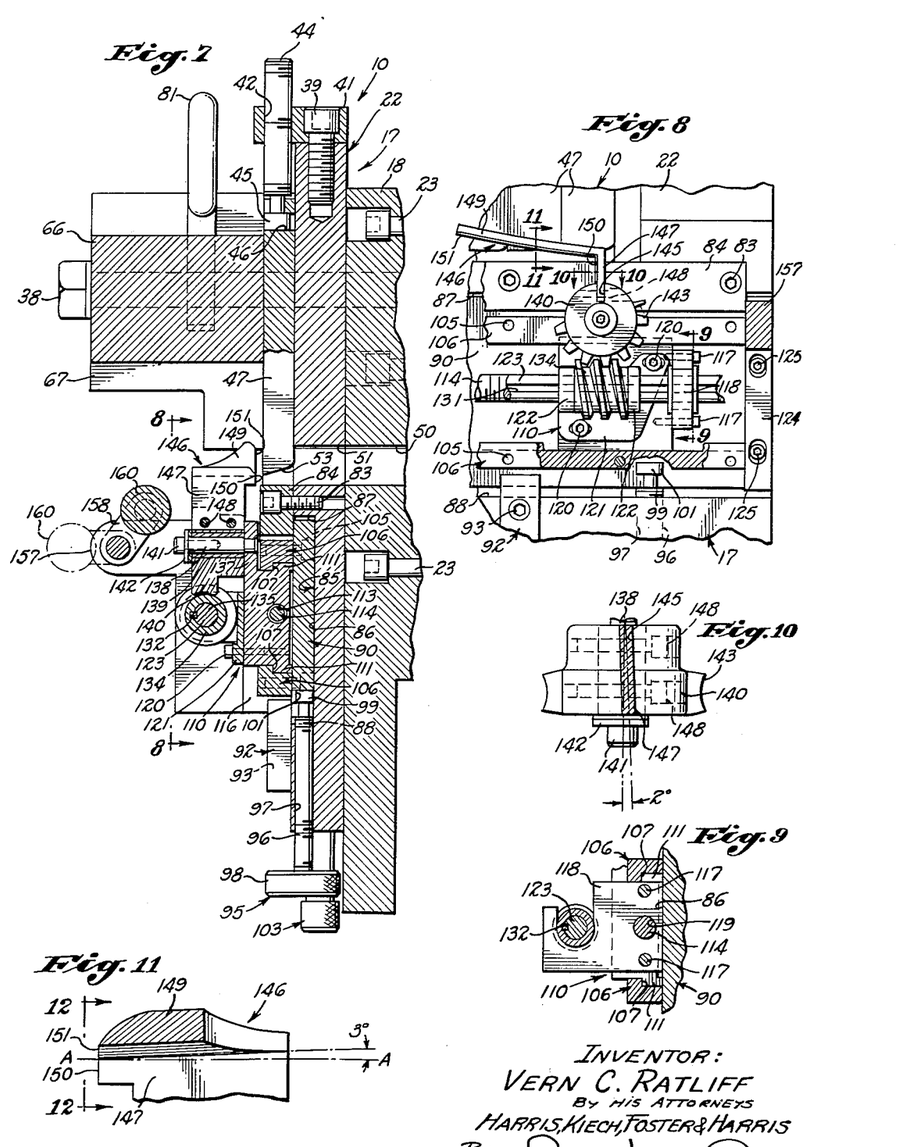
Fig. 7 is an enlarged, vertical sectional view taken on the broken line 7—7 of Fig. 2.
Fig. 8 is an enlarged, partly sectional, fragmentary view taken from the broken line 8—8 of Fig. 7.
Fig. 9 is an enlarged, fragmentary, partly sectional view taken from the broken line 9—9 of Fig. 8.
Fig. 10 is an enlarged, partly sectional view taken from the broken line 10—10 of Fig. 8.
Fig. 11 is an enlarged, transverse, partly sectional view taken on the broken line 11—11 of Fig. 8.
Figure 12:
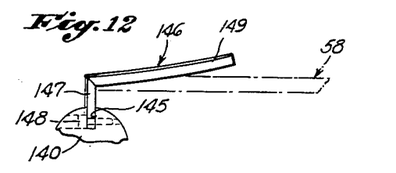
Fig. 12 is a schematic view showing the manner in which one of the cutter means of the adjustable die cuts a wing on the strip of plastic material.

Secured to the top of the die supporting plate 22, as best shown in Figs. 2, 3, 4 and 7, is an elongated bar 41 which is retained upon the die supporting plate 22 by means of bolts 39. A plurality of threaded openings 42 arranged in side-by-side relationship are provided along the length of the bar 41, said openings being adapted to receive a plurality of die actuators 44 which are constituted by shafts having threaded peripheries in engagement with the threaded openings 42 in the bar 41. Formed integrally with the lowermost ends of the die actuators 44 are substantially cylindrical mounting heads 45, said heads being receivable in correspondingly shaped openings 46 formed in the uppermost ends of a plurality of vertically shiftable die blades 47. As best shown in Fig. 7 of the drawings, the back of each of the die blades 47 is maintained in contact with the face of the die supporting plate 22 and the rotation of the die actuators 44 in the openings 42 in the mounting bar 41 causes the die blades 47 to be moved vertically up and down on the face of the die supporting plate 22.

Figure 6:
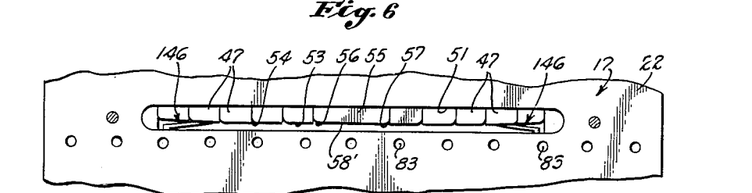
Fig. 6 is a fragmentary, rear elevational view taken from the broken line 6—6 of Fig. 3.

As best shown in Figs. 3 and 7, the neck 20 of the tubing machine 11 is provided with a horizontal opening 49 which is in registry with a horizontal slot 50 formed in the mounting plate 18, said slot 50, in turn, communicating with a transverse opening 51 in the die supporting plate 22. Thus, plastic material, in the present instance, a rubber compound, is fed from the tubing machine 11 through the opening 49 and the slot 50 to the transverse opening 51 in the die supporting plate. As best shown in Figs. 3 and 6, the die blades 47 are adapted to traverse the opening 51 in the die supporting plate 22 to alter the configuration of the upper half of said opening for a purpose which will be described in greater detail below.

Figure 13:
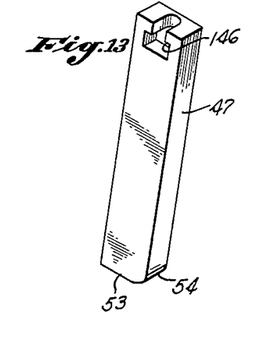
Fig. 13 is a perspective view showing one of the adjustable die members of my invention.

Each of the die blades 47, as best shown in Figs. 2, 6 and 13 of the drawings, has formed upon the base 53 thereof, at a lateral edge of said base, a radius portion 54 which is immediately juxtaposed to the non-radiused portion of the base 53 of the adjacent die blade. It will be noted that a central die blade 55 which is substantially twice the width of its companion die blade is provided and has oppositely disposed radius portions 56 and 57 formed at opposite edges of the base 58' thereof. When the rubber stock is configured by passing under the die blades 47 and 55, the radius portions provided at the lateral edges of the bases of the die blades serve to accommodate spring-back of the rubber stock and also serve to prevent sharp step-like formations from being formed on the rubber stock by the edges of adjacent die blades when they are adjusted into different vertical positions with reference to one another. Instead of extruding the rubber with a plurality of angular steps formed in the surface thereof attributable to the varying settings of the bases of the die blades, a plurality of imperceptible lines are formed in the surface of the extruded strip which ultimately disappear when the stock is rolled and stored.

Also of importance is the fact that the bases 53 and 58' of the die blades, as best shown in Figs. 3 and 7 of the drawings, have an angular configuration from the front to the back thereof, this configuration serving to channel down the rubber stock as it passes under the blades and to prevent the inadvertent vulcanization of the stock. This is important because it is essential that the plastic quality of the rubber stock be maintained until the extruding operation is completed.

Figure 14:
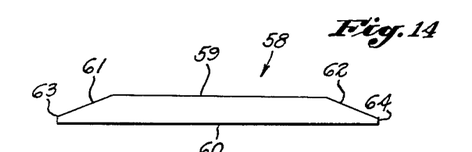
Fig. 14 is a transverse, sectional view of a typical configuration of a strip of recapping material which can be formed by the adjustable die of my invention.

A typical section of recapping stock extruded from an adjustable die constructed in accordance with my invention is shown in Fig. 14 of the drawings and includes a crown 59 and a base 60, said crown having oppositely disposed wings 61 and 62, said wings having lateral edges 63 and 64. The adjustable die blades 47 and the centrally disposed die blade 55 are adapted to form the configuration of the crown 59 of a strip 58 of recapping stock. Since there are literally hundreds of different crown configurations necessitated by the wide variety of different types and sizes of tires in use at the present time and since relatively short runs of a particular configuration may be made, it is obvious that the ease with which the configuration of the strip 58 may be changed by manipulating the die actuators 44 to raise and lower the die blades 47 and 55 materially affects the production which can be obtained from a single tubing machine and also the accuracy of the configurations of the strip.

As the rubber stock is extruded through the opening 51 in the die supporting plate, tremendous pressure is exerted upon the die blades 47 and 55 tending to urge them outwardly away from contact with the face of the die supporting plate 22. Obviously, no outward movement of the die blades 47 and 55 can be permitted because such outward movement would alter the configuration of the strip 58 of rubber stock being extruded thereby. To eliminate the possibility of such outward movement of the die blades 47 and 55, there is provided a transversely positioned die blade supporting bar 66 which has its opposite ends secured to opposite ends of the die supporting plate 22 through the intermediary of brackets 67 and 68 which are, respectively, fastened to said ends of said plate by means of bolts 69 and 70. The ends of the bar 66 are secured to the brackets 67 and 68 by means of bolts 71 and dowel pins 72, the dowel pins 72 serving to prevent the axial twisting of said bar between said brackets when the die blades 47 and 55 are urged thereagainst by the pressure of the rubber stock extruded from the tubing machine. Dowel pins 73, as best illustrated in Fig. 2 of the drawings, also are provided in the brackets 67 and 68 to prevent said brackets from being expanded outwardly by the pressures to which the transverse bar 66 is subjected.

The transverse die supporting bar 66 is spaced a minimal distance from the front of the die blades 47 and 55, as best shown in Fig. 7, so that no mislocation of the die blades with respect to the die supporting plate 22 will occur. To insure that the transverse bar 66 will be maintained in proper spaced relationship with the faces of the die blades 47 and 55, there are provided oppositely disposed spacer blocks 75 and 76, Fig. 2, which are mounted on the face of the die mounting plate 22 and which are secured thereto by dowel pins 77 or similar fasteners. It will be noted that the die blades 47 adjacent the spacer blocks 75 and 76 have longitudinal notches 78 formed in juxtaposed sides thereof to create vertical rectangular spaces which will permit the blades adjacent the spacer blocks 75 and 76 to be moved vertically therepast. It should also be noted that the centrally located die blade 55 has a vertical slot 79 formed therein to permit the passage of one of the securing bolts 38 therethrough and to permit the centrally located die blade 55 to be vertically moved with respect to the shank of said bolt. Therefore, the spacer blocks 75 and 76 maintain the transverse die supporting bar 66 a predetermined, minimal distance away from the front faces of the die blades 47 and 55, thus insuring that the die blades will move freely between the face of the die supporting plate 22 and the back of the transverse die supporting bar 66, but also insuring that no untoward movement of the die blades will occur when they are subjected to the outward pressure of the rubber flow.

A lifting eye 81 provided in the center of the transverse die supporting bar 66 is securely fastened thereto, as best shown in Figs. 1, 3–4 and 7 of the drawings, to facilitate the handling of the adjustable die when it is removed from its mounting upon the neck 20 of the tubing machine 11 by the removal of the die mounting plate 18 from said machine.

Fastened to the face of the supporting plate 22 by means of screws 83 is a base bar 84 which has its top portion juxtaposed to the lower edge of the slot 51 in the supporting plate 22 and which is adapted to define the base 60 of the strip 58 of rubber as it passes beneath the vertically shiftable die blades 47 and 55. It will be noted that the base bar 84 is disposed in substantially the same vertical plane as the movable and shiftable die blades 47 and 55 and is adapted to bear the downward thrust of said die blades as imposed upon the upper surface of the strip of rubber.

A transverse depression 85 having a straight bottom wall 86 and upper and lower side walls 87 and 88 is, as best shown in Figs. 3 and 7, formed in the face of the die supporting plate 22. Disposed within the transverse depression 85 and adapted to be moved vertically therein between the upper and lower side walls 87 and 88 thereof, is a substantially rectangular carriage 90, the width of said carriage being approximately 1/16 inch less than the width of the transverse depression 85, to permit said carriage to be moved vertically within the depression. The upper edge of the carriage 90, as best shown in Figs. 3 and 7 of the drawings, is overlapped by the lower portion of the base bar 84, said base bar 84 thus serving to maintain the upper edge of said carriage within the transverse depression 85. A plurality of rectangular retainers 92 are secured to the lower portion of the die supporting plate 22 by means of bolts 93 and have their upper portions arranged in overlapping relationship with the lower edge of the carriage 90, said upper portions of said retainers being adapted, in conjunction with the base bar 84, to retain the carriage 90 in the transverse depression 85.

A plurality of carriage actuators 95, as best shown in Figs. 2, 3 and 7, is located in the under side of the die supporting plate 22. Each of these actuators includes an elongated threaded shaft 96 receivable in a correspondingly threaded bore 97 formed in the lower portion of the die supporting plate 22. Secured to or formed integrally with the lowermost end of each of the threaded shafts 96 is a knurled control knob 98 which is adapted to rotate the shaft 96 in the bore 97 to cause the shaft to move vertically therein to raise and lower an actuating head 99 receivable in a recess 101 in the lowermost edge of the carriage 90. Thus, by rotating the threaded shafts 96 of the carriage actuators 95 in the proper direction, the actuating heads 99 thereof can be raised and lowered to cause the carriage 90 to be raised and lowered within the transverse depression 85 in the die supporting plate 22. Fastened in the lowermost edge of the die supporting plate 22 and positioned adjacent the carriage actuators 95, are elongated guard members 103 which are adapted to support the adjustable die 10 when it is removed from its operative position and is vertically disposed upon a horizontal surface for repair or adjustment, said guard members also serving to prevent the carriage actuators 95 from being inadvertently struck after adjustment, which would cause the position of the carriage 90 in the transverse depression 85 to be changed and, thus, would alter the configuration of the strip 58 passing through the die.

Secured to the face of the carriage 90 by means of screws 105, as best shown in Figs. 2 and 7 of the drawings, are oppositely disposed tracks 106 which are positioned adjacent the upper and lower edges of the carriage 90, said tracks having retaining shoulders 107 formed thereupon for a purpose which will be described in greater detail below.

Positioned between the tracks 106 are substantially identical, laterally shiftable, oppositely disposed mounts 110, as best shown in Figs. 2, 7 and 8 of the drawings, each of said mounts having a substantially rectangular body provided with upwardly and downwardly projecting lands 111 adapted to engage the shoulders 107 on the tracks 106 and to be retained thereby for sliding movement across the face of the carriage 90. Formed in each of the mounts 110, as best shown in Fig. 7 of the drawings, is a threaded, transverse opening 113, said threaded opening 113 receiving an elongated lead screw 114 which is oppositely threaded on opposite sides of the center line of the die 10 to cause the mounts 110 to be shifted toward and away from each other laterally when the lead screw is rotated by means of a crank 115 attached to one end thereof. The opposite ends of the lead screw 114 are journaled in bearing blocks 116 secured to the opposite ends of the carriage 90.

Secured to each of the mounts 110 at one side thereof is an auxiliary supporting block 118, as best shown in Figs. 8 and 9, the supporting blocks being retained on the mounts 110 by means of screws 117 and having transverse openings 119 adapted to receive the lead screw 114. As best can be seen from Fig. 9 of the drawings, the base of the supporting block 118 is firmly seated against the bottom wall 86 of the transverse depression 85 and serves to prevent the mounts 110 from being shifted downwardly on the lead screw 114 when pressure is exerted on the mounts, in a manner to be described below.

Secured to the top of each of the mounts by screws 120, as best shown in Figs. 7 and 8 of the drawings, is a bearing block 121, said bearing block having two spaced, outwardly directed lugs 122 formed integrally therewith which provide journals for a shaft 123 extending therethrough. The opposite ends of the shaft 123 are journaled in bearing blocks 124, said bearing blocks being secured to the bearing blocks 116 by means of screws 125. Secured to one end of the shaft 123 is a control knob 127, as best shown in Figs. 2 and 3 of the drawings. When the control knob 127 is rotated, the shaft 123 is correspondingly rotated. A journal block 128 is secured to the surface of the carriage 90 at the center thereof by means of screws 129 and serves to support the centers of the lead screw 114 and the shaft 123. Disposed in keyways 131 in the shaft 123 on opposite sides of the journal block 128 are keys 132.

Disposed between the lugs 122 on each of the bearing blocks 121 is a worm 134, each of the worms 134 being mounted on the shaft 123 at opposite sides of the journal block 128 and being prevented from lateral displacement on the shaft 123 by means of the lugs 122 of the bearing blocks 121 and having incorporated therein a keyway 135 adapted to receive the key 132 on the shaft 123. Therefore, when the shaft 123 is rotated by means of the control knob 127, the rotational movement of said shaft is transmitted to the worms 134 by means of the keys 132 disposed between the shaft 123 and the worms 134.

When the crank 115 is rotated to cause the rotation of the lead screw 114, the laterally shiftable mounts 110 are moved toward or away from each other because of the opposite threading of the lead screw on opposite sides of the journal block 128. Simultaneously, the worms 134 on the mounts 110 are laterally shifted therewith along the length of the shaft 123.

Secured to an upwardly projecting portion 137 of each of the laterally shiftable mounts 110 and projecting outwardly therefrom is a pivot pin 138, said pivot pin being adapted to receive a bushing 139 upon which is disposed a pinion 140. The pinion 140 is retained upon the pin 138 and the bushing 139 by a screw 141 and washer 142, said screw engaging said pin 138 to retain the pinion 140 thereupon. Each of the pinions 140 has a gear segment 143 formed thereupon which engages with the worm 134 juxtaposed thereto on the laterally shiftable mount 110. Thus, the rotation of the shaft 123 and the concomitant rotation of the worm 134 will cause the pinion 140 to be rotated on the pivot pin 138.

A radial slot 145 is provided in each of the pinions 140, as best shown in Figs. 8 and 10 of the drawings. Positioned in the slot 145 of each of the pinions 140 is a cutter 146, each cutter 146 having a vertical blade 147 which is secured in the slot 145 by means of screws 148 and having a horizontal blade 149 which is formed integrally with the vertical blade 147. As best shown in Fig. 11 of the drawings, the vertical blade 147 of each of the cutters 146 provides a vertical cutting edge 150, said vertical cutting edge of each of said cutters 146 being adapted to cut the lateral edges 63 and 64 on the wings 61 and 62 of the strip 58 of rubber stock being extruded through the die.

Each of the cutters 146 is provided with a transverse cutting edge 151 which constitutes the leading edge of the horizontal blade 149, said transverse cutting edge 151 being adapted to form the wings 61 and 62 upon the strip 58 of rubber stock extruded through the adjustable die 10, in a manner which will be described in greater detail below. It will be noted that the vertical blade 147 is disposed in a vertical plane which is substantially perpendicular to the base of the die supporting plate 22. However, as best shown in Fig. 10 of the drawings, the radial slot 145 is inclined at an angle of approximately 2° to position the vertical blade 147 in such a manner that the vertical cutting edge 150 thereof is disposed inwardly of the trailing edge thereof so that when the lateral edges 63 and 64 are cut by the vertical cutting edges 150 on the vertical blades 147, the lateral edges 63 and 64 will not drag against the remainder of the vertical blades 147 and will clear them to prevent the strip 58 from being deformed and to allow for spring-back of the rubber stock of the strip. In other words, the vertical blade 147 has been rotated inwardly, by the inclination of the slot 145 in the pinion 140, 2° out of a plane perpendicular to the base of the die supporting plate 22. This is a most important feature of my invention since it permits accurately formed and thoroughly controlled lateral edges to be formed on the wings of the strip as it passes from the die.

In order to accommodate for the spring-back of the rubber stock subsequently to the cutting of the wings 61 and 62 upon the strip 58 and to prevent the wings 61 and 62 from dragging upon the horizontal blade 149 subsequently to the cutting of the wings by the transverse cutting edge 151, the entire horizontal blade 149 is inclined in a plane so that the trailing edge thereof is 3° above a horizontal reference plane A—A, as shown in Fig. 11 of the drawings. Thus, the transverse cutting edges 151 of the horizontal blades 149 are disposed at points substantially lower than the remainders of the blades so that, subsequently to the cutting of the wings 61 and 62 upon the strip 58, the wings will not drag upon the remainders of the horizontal blades 149 adjacent the transverse cutting edges 151, and to allow for spring-back of the rubber stock at the wings of the strip. This is a very important feature of my invention because it permits the maintenance of the dimensions of the wings of the stock with absolute accuracy and prevents the stock from being distorted by dragging along the under surfaces of the horizontal blades 149.

As best illustrated in Fig. 1 of the drawings, when the wings 61 and 62 and the lateral edges 63 and 64 have been formed on the strip 58 by means of the cutters 146, strips 153 of surplus material are carried upwardly from the adjustable die 10 and returned to the source of supply, not shown. The strip 58 is then transferred to a conveyor belt 154 supported on a frame 155 and is passed through a cooling zone, not shown.

Brackets 157 are provided on the die supporting plate 22 at opposite sides thereof, each of said brackets having pivotally mounted thereupon a lever 158. One of the levers 158 has integrally formed therewith a handle 159, for a purpose which will be described in greater detail below. Rotatably mounted between and secured to the levers 158 is an elongated, horizontally disposed support roller 160, said support roller integrating the levers 158 so that the movement of one of the levers is accompanied by the concomitant movement of the other one. Thus, as best shown in Figs. 3 and 7 of the drawings, the handle 159 is adapted to swing the support roller 160 between a first, upper position in which the support roller is positioned adjacent the cutters 146 and adapted to support the strip 58 issuing from the adjustable die 10 and a second lower position indicated by the dotted line in Fig. 7 of the drawings, in which the roller 160 is swung downwardly out of the path of the stock to permit access to be had to the cutters 146 and to the lower ends of the adjustable die blades 47 and 55.

The operation of the adjustable die 10 is as follows:

When it is desired to form a strip having a configuration similar to that of the strip 58 shown in Fig. 14 of the drawings, the adjustable die blades 47 and 55 are vertically shifted by means of the die actuators 44 to a position wherein the desired shape of crown 59 is achieved. Subsequently, the carriage actuators 95 are adjusted by means of the control knobs 98 to raise and/or lower the carriage 90 to correspondingly raise or lower the cutters 146 upon the mounts 110. By thus raising or lowering the carriage 90, the height of the lateral edges 63 and 64 of the strip 58 can be controlled with utmost accuracy because the vertical cutting edges 150 and the intersection between said vertical cutting edges 150 and the transverse cutting edges 151 of the cutters 146 determine the height of said lateral edges. This is a most important feature of my invention since, in the past, it has been extremely difficult to attain the minute variances in the height of the lateral edges which recappers have demanded. The wide variety of height required is attributable, in part, to the fact that recapping molds are subjected to wear because of the sandblasting processes utilized in cleaning such molds. Therefore, the height of the lateral edges demanded by any two recappers is never identical because, in addition, different recapping shops utilize different techniques in recapping tires which necessitate the provision of stock having edges of different heights. Thus, by the simple expedient of vertically shifting the carriage 90 through the control of the carriage actuators 95, the adjustable die is capable of producing strips of recapping stock having wide varieties of lateral edge heights.

Subsequently to the adjustment of the height of the cutter by the vertical movement of the carriage 90, it is necessary to shift the cutters 146, through the medium of the laterally shiftable mounts 110, toward or away from each other in order to determine the maximum width of the recapping strip which is to be cut. This is readily accomplished by rotating the crank 115 associated with the lead screw 114, the rotation of the crank in one direction causing the mounts 110 to move toward each other and the rotation of the crank in the opposite direction causing the mounts to move away from each other to correspondingly reduce or increase the width of the strip to be formed.

After the cutters have been adjusted to the desired width by the lateral shifting of the mounts 110, it is then necessary to rotate the cutters on the pinions 140 to cause the transverse cutting edges 151 thereof to be disposed at angles which will produce a desired wing angle on the strip of recapping stock issuing from the die. This is readily accomplished by rotating the control knob 127 to cause the concomitant rotation of the shaft 123 whereby the worms 134 are rotated to cause the pinion 140 to be revolved on the pivot pin 138. In this manner the cutters 146 are revolved in an arc across the transverse opening 51 in the die supporting plate 22 and the desired angle of wing with respect to crown and lateral edge can be attained.

One of the most important aspects of my invention is the fact that, as the strip 58 of rubber stock is fed from the vertically adjustable die blades 47 and 55 to the cutters 146, and the lateral edges and wings are formed on the strip 58 by the action of the vertical and transverse cutting edges of the cutters, the inclined positions of the transverse and vertical cutting edges of the cutters, respectively, downwardly from a horizontal plane and inwardly from a plane perpendicular to the face of the supporting plate 22, prevent the stock from dragging across the blades of the cutters and permit an accurately dimensioned and configured strip 58 to be formed.

Also of importance is the fact that the various adjustments necessary to change the configuration of the strip 58 of rubber stock can be performed during the operation of the tubing machine 11 and the die 10, thus eliminating the shutdown on production which is encountered in the use of conventional fixed dies. Naturally, this eliminates the time previously expended in setting up and taking down conventional dies and also eliminates the necessity for maintaining and stocking a tremendous number of different size dies required to form different sizes of recapping stock.

It is also possible by the use of a die constructed in accordance with my invention to run limited lengths of out-size recapping stock which it was not previously feasible to do because the cost of preparing a special die would not warrant the manufacture of such limited runs of special size stock.

The die itself is extremely simple in construction and can be easily maintained and, if necessary, repaired, and can also be readily mounted upon and removed from the tubing machine 11.

I claim as my invention:

1. In a die for extruding plastic materials, the combination of: a frame providing an opening for the extrusion of a strip of plastic material therethrough; a plurality of adjustable die members of constant width mounted in said frame in edge-to-edge relation adjacent said opening to configure the top of said strip subsequently to its issuance from said opening; and adjustable cutters supported on said frame adjacent said opening for removing a predetermined quantity of material from the configured strip, each of said cutters having a first vertical cutting edge for cutting the configured strip to a predetermined width, and a second inclined cutting edge for removing a predetermined portion of the top of said configured strip, means being included in the cutter adjustment for bodily raising and lowering said inclined cutting edge.

2. In a die for extruding plastic materials, the combination of: a frame providing an opening for the extrusion of a strip of plastic material therethrough; a plurality of adjustable die members mounted in said frame adjacent said opening to configure said strip subsequently to its issuance from said opening; a carriage supported on said frame adjacent said opening for movement in a vertical plane toward and away from said opening; and a plurality of cutters mounted on said carriage, each of said cutters having a first cutting edge for cutting the configured strip to a predetermined width and a second cutting edge for removing a predetermined quantity of material from the top of said strip, said carriage moving said cutters vertically across said opening to determine the height of the sides of said configured strip by raising and lowering said first and second cutting edges of said cutters with reference to said strip.

3. In a die for extruding plastic materials, the combination of: a frame providing an opening for the extrusion of a strip of plastic material therethrough; a plurality of vertically adjustable die members of constant width having their lateral edges in abutting relationship and mounted in said frame adjacent said opening to configure said strip subsequently to its issuance from said opening; an elongated die member extending transversely below said plurality of die members to define the thickness of said strip and the under side thereof in conjunction with the lower ends of said adjustable die members which define the upper side thereof; a vertically movable carriage supported on said frame adjacent said opening for movement in a vertical plane toward and away from said opening; a plurality of laterally movable mounts on said carriage; and cutter means mounted on each of said laterally movable mounts, said cutter means each having a first cutting edge for cutting the configured strip to a predetermined width and a second cutting edge for removing a predetermined quantity of material from the top of said strip, said carriage being adapted to move said cutter means vertically across said opening to determine the height of the sides of said configured strip by raising and lowering said cutter means with reference to said strip and said laterally movable mounts being laterally shiftable with reference to said opening to move said cutter means to cut the configured strip to a predetermined width.

4. In a die for extruding plastic materials, the combination of: a frame providing an opening for the extrusion of a strip of plastic material therethrough; a plurality of adjustable die members mounted in said frame adjacent said opening to configure said strip subsequently to its issuance from said opening; and adjustable cutters supported on said frame adjacent said opening for removing a predetermined quantity of material from the configured strip, said cutters each having a first cutting edge for cutting the configured strip to a predetermined width, and a second cutting edge for removing a predetermined portion of the top of said configured strip, said cutters being rotatable bodily in a plane parallel to the plane of said frame to vary the height of said second cutting edge to determine the quantity of material removed from said configured strip.

5. In a die for extruding plastic materials, the combination of: a frame providing an opening for the extrusion of a strip of plastic material therethrough; a plurality of die actuators in said frame; a plurality of adjustable die members connected to said actuators and mounted in said frame adjacent said opening, said die members being movable with reference to one another to configure said strip subsequently to its issuance from said opening, the base of each of said die members having a radius formed at a lateral edge thereof to accommodate for spring-back of said plastic material; and adjustable cutters supported upon said frame adjacent said opening for removing a predetermined quantity of material from the configured strip.

6. In a die adapted to be utilized in conjunction with a machine for forming plastic material from said machine into a strip having a base, a crown, and wings of predetermined height at opposite sides of said crown, the combination of: a frame providing an opening for the extrusion of a strip of plastic material therethrough; a movable carriage supported on said frame adjacent said opening for movement in a vertical plane toward and away from said opening; and a plurality of cutters mounted on said carriage, each of said cutters having a first cutting edge vertically disposed for cutting the strip to a predetermined width and a second cutting edge transversely disposed for cutting the wings at opposite sides thereof, said carriage being adapted to move said cutters vertically across said opening to determine the height of the sides of said wings by raising and lowering said second cutting edges with reference to said strip.

7. In a die adapted to be utilized in conjunction with a machine for forming plastic material from said machine into a strip having a base, a crown, and wings at opposite sides of said crown, the combination of: a vertical frame providing an opening for the extrusion of a strip of plastic material therethrough; and a plurality of cutters mounted on said frame, each of said cutters having a substantially vertical blade providing a lateral cutting edge to cut the sides of said wings and a substantially horizontal blade providing a transverse cutting edge to cut the upper surfaces of said wings, said vertical blade lying in a vertical plane inwardly inclined with respect to the plane of said frame to accommodate for spring-back of said material at the sides of said wings.

8. In a die adapted to be utilized in conjunction with a machine for forming plastic material from said machine into a strip having a base, a crown, and wings at opposite sides of said crown, the combination of: a vertical frame providing an opening for the extrusion of a strip of plastic material therethrough; and a plurality of cutters, each of said cutters having a substantially vertical blade providing a lateral cutting edge to cut the sides of said wings and a substantially horizontal blade providing a transverse cutting edge to cut the upper surfaces of said wings, said horizontal blade lying in a downwardly inclined horizontal plane with respect to the plane of said frame to accommodate for spring-back of said material at the upper surfaces of said wings.

9. In a die adapted to be utilized in conjunction with a machine for forming plastic material from said machine into a strip having a base, a crown, and wings at opposite sides of said crown, the combination of: a vertical frame providing an opening for the extrusion of a strip of plastic material therethrough; and a plurality of cutters mounted on said frame, each of said cutters having a substantially vertical blade providing a lateral cutting edge to cut the sides of said wing and a substantially horizontal blade providing a transverse cutting edge to cut the upper surfaces of said wings, said vertical blade lying in a vertical plane inwardly inclined with respect to the plane of said frame to accommodate for spring-back of said material at the sides of said wings and said horizontal blade lying in a horizontal plane downwardly inclined with respect to the plane of said frame to accommodate for spring-back of said material on the upper surfaces of said wings.

10. In a die adapted to be utilized in conjunction with a machine for forming plastic material from said machine into a strip having a base, a crown, and wings at opposite sides of said crown, the combination of: a die supporting frame attached to said machine and providing an opening for the extrusion of plastic material therethrough; a plurality of die actuators mounted in said frame; a plurality of individually actuable dies secured to said actuators, said dies being arranged in side-by-side relationship and having their lower ends disposed adjacent said opening to form the basic configuration of said crown; a vertically movable carriage mounted on said frame adjacent said opening for movement in a vertical plane; a plurality of laterally shiftable mounts on said carriage; and a plurality of cutters, each of said cutters having a substantially vertical blade providing a lateral cutting edge and a substantially horizontal blade providing a transverse cutting edge and being mounted on one of said mounts, said cutters being adapted to be moved laterally on said mounts with respect to each other to vary the space between said lateral cutting edges and being adapted to be shifted vertically on said carriage to raise and lower said transverse cutting edges with reference to said opening.

11. In a die adapted to be utilized in conjunction with a machine for forming plastic material from said machine into a strip having a base, a crown, and wings at opposite sides of said crown, the combination of: a die supporting frame attached to said machine and providing an opening for the extrusion of plastic material therethrough; a plurality of die actuators mounted in said frame; a plurality of individually actuable dies secured to said actuators, said dies being arranged in side-by-side relationship and having their lower ends disposed adjacent said opening to form the basic configuration of said crown; a movable carriage mounted on said frame adjacent said opening; rotatable means secured on said carriage; and a plurality of cutters, one of said cutters being mounted on each of said rotatable means to permit said cutters to be rotated bodily with respect to said opening.

12. In a die adapted to be utilized in conjunction with a machine for forming plastic material from said machine into a strip having a base, a crown, and wings at opposite sides of said crown, the combination of: a die supporting frame attached to said machine and providing an opening for the extrusion of plastic material therethrough; a plurality of die actuators mounted in said frame; a plurality of individually actuable dies secured to said actuators, said dies being arranged in side-by-side relationship and having their lower ends disposed adjacent said opening to form the basic configuration of said crown; a vertically movable carriage mounted on said frame adjacent said opening; a plurality of laterally shiftable mounts on said carirage; actuating means on said carriage for shifting said mounts toward and away from each other; and a plurality of cutters, one of said cutters being secured to each of said mounts, said cutters being adapted to be shifted laterally on said mounts by said actuating means toward and away from each other and to be moved vertically on said carriage toward and away from said opening.

13. In a die adapted to be utilized in conjunction with a machine for forming plastic material from said machine into a strip having a base, a crown, and wings at opposite sides of said crown, the combination of: a die supporting frame attached to said machine and providing an opening for the extrusion of plastic material therethrough; a plurality of die actuators mounted in said frame; a plurality of individually actuable dies secured to said actuators, said dies being arranged in side-by-side relationship and having their lower ends disposed adjacent said opening to form the basic configuration of said crown; a movable carriage mounted on said frame adjacent said opening; rotatable means mounted on said carriage; rotating means on said carriage for causing the rotation of said rotatable means; and a plurality of cutters, one of said cutters being mounted on each of said rotatable means to permit said cutters to be rotated bodily with respect to said opening.

References Cited in the file of this patent

UNITED STATES PATENTS

| | | |
|---|---|---|
| 529,280 | Leek | Nov. 13, 1894 |
| 686,365 | Thackray | Nov. 12, 1901 |
| 1,252,821 | Lewis | Jan. 8, 1918 |
| 1,258,874 | Clayton | Mar. 12, 1918 |
| 1,350,722 | Goodenberger | Aug. 24, 1920 |
| 1,454,058 | Lowe | May 8, 1923 |
| 1,922,770 | Kornbrath | Aug. 15, 1933 |
| 2,218,751 | Humphrey | Oct. 22, 1940 |
| 2,346,393 | Render | Apr. 11, 1944 |
| 2,578,229 | Clement et al. | Dec. 11, 1951 |